(12) United States Patent
Kosha (10) Patent No.: US 7,945,742 B2
(45) Date of Patent: May 17, 2011

(54) ELECTRONIC DEVICE, RECORDING CONTROL METHOD AND RECORDING MEDIUM

(75) Inventor: Nobuyuki Kosha, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1038 days.

(21) Appl. No.: 11/116,407

(22) Filed: Apr. 28, 2005

(65) Prior Publication Data

US 2006/0143670 A1    Jun. 29, 2006

(30) Foreign Application Priority Data

Dec. 28, 2004  (JP) .................................. 2004-380597

(51) Int. Cl.
*G06F 12/00* (2006.01)
*H04N 7/173* (2011.01)
(52) U.S. Cl. .................. 711/154; 711/E12.084; 725/100
(58) Field of Classification Search .................... 711/154
See application file for complete search history.

(56) References Cited

U.S. PATENT DOCUMENTS

| 6,243,819 | B1 | 6/2001 | Jung | |
|---|---|---|---|---|
| 2002/0100049 | A1* | 7/2002 | Yamato et al. | 725/47 |
| 2003/0035550 | A1* | 2/2003 | Kimura | 381/66 |
| 2003/0142087 | A1 | 7/2003 | Shiotsu et al. | |
| 2004/0240850 | A1* | 12/2004 | Kamio | 386/95 |
| 2005/0288903 | A1* | 12/2005 | Jackson et al. | 702/187 |

FOREIGN PATENT DOCUMENTS

| JP | 5-103254 | A | 4/1993 |
|---|---|---|---|
| JP | 09-200671 | | 7/1997 |
| JP | 9-200671 | | 7/1997 |
| JP | 2000-251408 | | 9/2000 |
| JP | 2002-175665 | A | 6/2002 |
| JP | 2003-150455 | A | 5/2003 |
| JP | 2003-219296 | | 7/2003 |
| JP | 2003-283958 | | 10/2003 |
| JP | 2004-274205 | A | 9/2004 |
| JP | 2004-312403 | | 11/2004 |

OTHER PUBLICATIONS

German Communication dated Sep. 22, 2006 in corresponding German Patent Application No. 10 2005-019634.9.
Japanese Notice of Reasons for Rejection mailed Jan. 26, 2010 for Japanese Patent Application No. 2004-380597. An English-language translation of the Notice is attached for the Examiner's information.
"Japanese Office Action" mailed by JPO and corresponding to Japanese application No. 2004-380597 on Jan. 18, 2011, with English translation.

* cited by examiner

*Primary Examiner* — Reginald G Bragdon
*Assistant Examiner* — Aracelis Ruiz
(74) *Attorney, Agent, or Firm* — Fujitsu Patent Center (57) ABSTRACT

To provide a technology for stopping recording in an improper state by detecting whether an electronic device is in the process of being carried or not, and so on. Data signals that have been broadcast are received, the data signals are recorded on a storage unit at preset time, a state related to the recording of the data signals is detected, the data signals are recorded, and the recording of the data signals is stopped corresponding to a result of the detection.

20 Claims, 7 Drawing Sheets

| iEPG PROGRAM TABLE | | TOKYO, ○-DAY, ○-MONTH | | | |
|---|---|---|---|---|---|
| | 1 CH | 3 CH | 4 CH | 6 CH | 8 CH | 10 CH |
| 7 | 7:00 XXXXXX [RESERVE] 7:30 XXXXXX [RESERVE] | 7:00 XXXXXX | 7:00 XXXXXX [RESERVE] 7:30 XXXXXX [RESERVE] | 7:00 XXXXXX 7:30 XXXXXX [RESERVE] | 7:00 XXXXXX [RESERVE] | 7:00 XXXXXX [RESERVE] |
| 8 | 8:00 XXXXXX | 8:30 XXXXXX [RESERVE] | 8:00 XXXXXX [RESERVE] | 8:00 XXXXXX [RESERVE] 8:30 XXXXXX [RESERVE] | 8:00 XXXXXX [RESERVE] 8:30 XXXXXX [RESERVE] | 8:30 XXXXXX [RESERVE] |
| 9 | 9:15 XXXXXX [RESERVE] | | 9:00 XXXXXX [RESERVE] | | 9:00 XXXXXX | |

FIG. 7

PERMITTED TO STOP RECORDING PROCESS?

| YES (Y) | NO (N) |

WAIT-FOR-INPUT TIME: 5 SEC REMAINING

ELECTRONIC DEVICE, RECORDING CONTROL METHOD AND RECORDING MEDIUM

BACKGROUND OF THE INVENTION

The invention relates to a technology for receiving and recording a TV broadcast and a radio broadcast.

Over the recent years, there has been wide spread of a personal computer (PC) loaded with a TV broadcast receiving function and capable of recording a TV broadcast by reservation. Along with this spread, there increasingly appear portable type electronic devices such as notebook type PCs loaded with the TV function.

Further, there are technologies disclosed in the following patent documents as the prior arts related to the invention of this application.

[Patent document 1] Japanese Patent Application Laid-Open Publication No. 9-200671

[Patent document 2] Japanese Patent Application Laid-Open Publication No. 2003-219296

[Patent document 3] Japanese Patent Application Laid-Open Publication No. 2000-251408

[Patent document 4] Japanese Patent Application Laid-Open Publication No. 2003-283958

[Patent document 5] Japanese Patent Application Laid-Open Publication No. 8-84440

SUMMARY OF THE INVENTION

In the conventional portable type electronic device having the TV broadcast reservation recording function, the reservation recording might be conducted in an unintentional state to a user who happens to forget the reservation of the recording, and so on.

For instance, if the user forgets the reservation of the recording and goes out while carrying the portable type electronic device and if the recording is performed during this user unconscious recording situation, the device must be operated by a battery, and there is a case of causing a problem such as being unable to completely record or becoming deficient of power when using the device at a go-out destination after recording, and so forth.

Further, if the recording is started during walking while carrying the device put into a bag, etc., the heat is not sufficiently radiated from the portable type electronic device in the bag, etc., and there might be a case of causing a damage to the device.

Moreover, though the user intends that the reservation for recording is made by connecting an external antenna, if the user forgets the reservation of this recording and goes out while carrying the portable type electronic device, the antenna is not connected even when starting the recording, and it follows that a picture is recorded in an ill-received state, resulting in futility.

Note that the prior art shown in patent document 1 discloses that a failure in the timer reservation recording is prevented due to power deficiency of the battery by preventing the power source from being cut off during the timer recording. In this prior art, for preventing the failure in recording, if driven by the battery when an indication of the timer reservation is given from the user, this reservation is not accepted.

This prior art is capable of preventing the failure in recording, however, the user is unable to, even in a case where the device can be driven by an AC power source at want-to-reserve recording start time in, e.g., a user's home, etc., make even this timer reservation when driven by the battery. Hence, there arises a problem that the user forgets the timer reservation, and the necessary recording is not made.

Moreover, during such recording, a CPU and a hard disc for recording the picture are always kept in an operating state with the result that a lot of heat is emitted therefrom. For example, in a device such as the notebook type PC in which an openable/closable (foldable) display unit is connected through a hinge to a computer body, if the recording process is executed for a long period of time when the display unit is in the closed state, as described above, a problem is that the heat emission from the CPU and the hard disc causes a high temperature in the interior of the computer body, and as a result the CPU gets thermal runaway that hinders an execution of the normal recording process.

Such being the case, the invention provides a technology for detecting a predetermined state about whether an electronic device is in the process of being carried or not, and stopping a process of recording, etc. in an improper state.

For solving the problems, the invention adopts the following configurations.

Namely, an electronic device of the invention comprises: a receiving unit for receiving data signals that have been broadcast; a control unit for recording the data signals on a storage unit at preset time; and a state detection unit for detecting a state related to the recording of the data signals, wherein the control unit stops recording the data signals in accordance with a result of the detection by the state detection unit.

In the electronic device, the state detection unit, when starting the recording of the data signals, may detect whether or not the electronic device is in the process of moving, and if in the process of moving, the control unit stops to start recording of the data signals.

Further, in the electronic device, the electronic device can be driven by both of a battery and an external power source, the state detection unit, when starting the recording of the data signals, may detect whether the battery is used or not, and if the battery is used, the control unit may stop the recording of the data signals.

The electronic device may further comprise a display unit capable of switching over a using state and a non-using state, the state detection unit, when starting the recording of the data signals, may detect which state, the using state or the non-using state, is displayed on the display unit, and in the case of the non-using state, the control unit may stop the recording of the data signals.

Moreover, the electronic device may be a computer utilizing BIOS and OS, and the BIOS may instruct the state detection unit to execute the detection, and may switch OFF a power of the computer without starting up the OS in the case of stopping the recording of the data signals in accordance with a result of the detection.

Furthermore, according to the invention, a recording control method for making a computer execute:

a step of receiving data signals that have been broadcast;

a step of recording the data signals on a storage unit at preset time; and a step of detecting a state related to the recording of the data signals, wherein the data signal recording step involves stopping the recording of the data signals in accordance with a result of the detection.

In the recording control method, when starting the recording of the data signals, it may be detected whether or not the computer is in the process of moving, and if in the process of moving, the recording of the data signals may be stopped.

In the recording control method, the computer can be driven by both of a battery and an external power source, when starting the recording of the data signals, it may be detected whether the battery is used or not, and if the battery is used, the recording of the data signals may be stopped.

Further, in the recording control method, the computer may include a display unit capable of switching over a using state and a non-using state, when starting the recording of the data signals, it may be detected which state, the using state or the non-using state, is displayed on the display unit, and in the case of the non-using state, the recording of the data signals may be stopped.

Further, the present invention may be a program to execute the above-mentioned steps of the recording control method by a computer. Moreover, the present invention may be a recording medium storing the program that is readable by the computer. Then, by causing the computer to read out the program from the recording medium and to execute the program, it is possible to provide a function of the program.

Here, the computer readable recording medium refers to a recording medium, in which information such as data or a program can be accumulated by an electrical, magnetic, optical, mechanical or chemical action, and the information can be read out by the computer. Examples of the recording media among such recording media, which are capable of being removed from the computer, include a flexible disc, a magneto-optical disc, a CD-ROM, a CD-R/W, a DVD, a DAT, an 8 mm tape, and a memory card.

In addition, a hard disc, a read only memory (ROM) and the like may be given as the recording media to be fixed to the computers.

The invention can provide a technology for stopping recording in an improper state by detecting whether an electronic device is in the process of being carried or not, and so on. Further, the invention enables a user to indicate a timer reservation at an arbitrary point of time, and makes it possible to restrain a timer-reserved process from being executed with futility while preventing the user from forgetting a timer reserving operation. Moreover, the invention can actualize the normal timer reservation recording without causing thermal runaway of the electronic device.

DETAILED DESCRIPTION OF THE PREFERRED EMBODIMENT

A best mode for carrying out the invention will hereinafter be described with reference to the drawings. A configuration of the embodiment is an exemplification, and the invention is not limited to the configuration of the embodiment.

Figure 1:
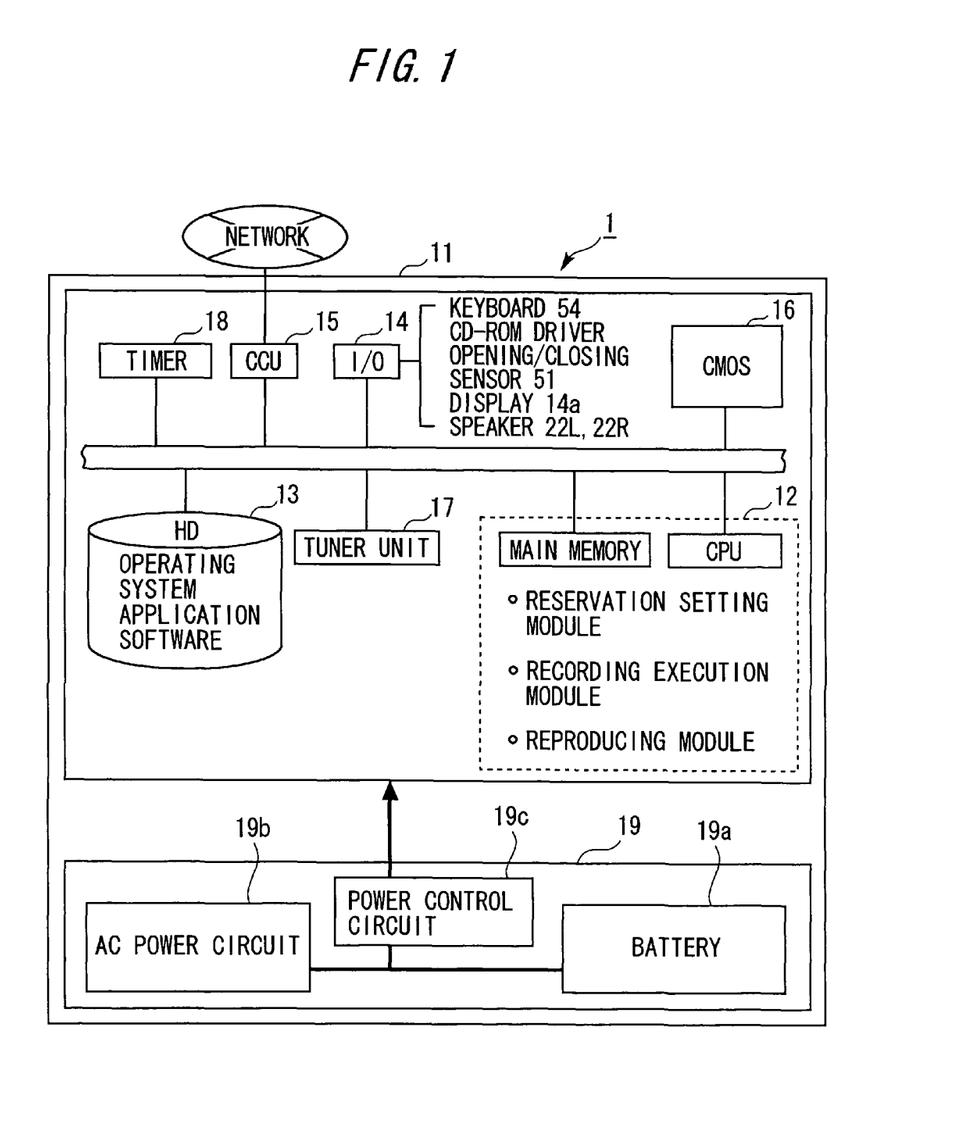
FIG. 1 is a view of an outline of configuration of an electronic device in a first embodiment.
Figure 2:
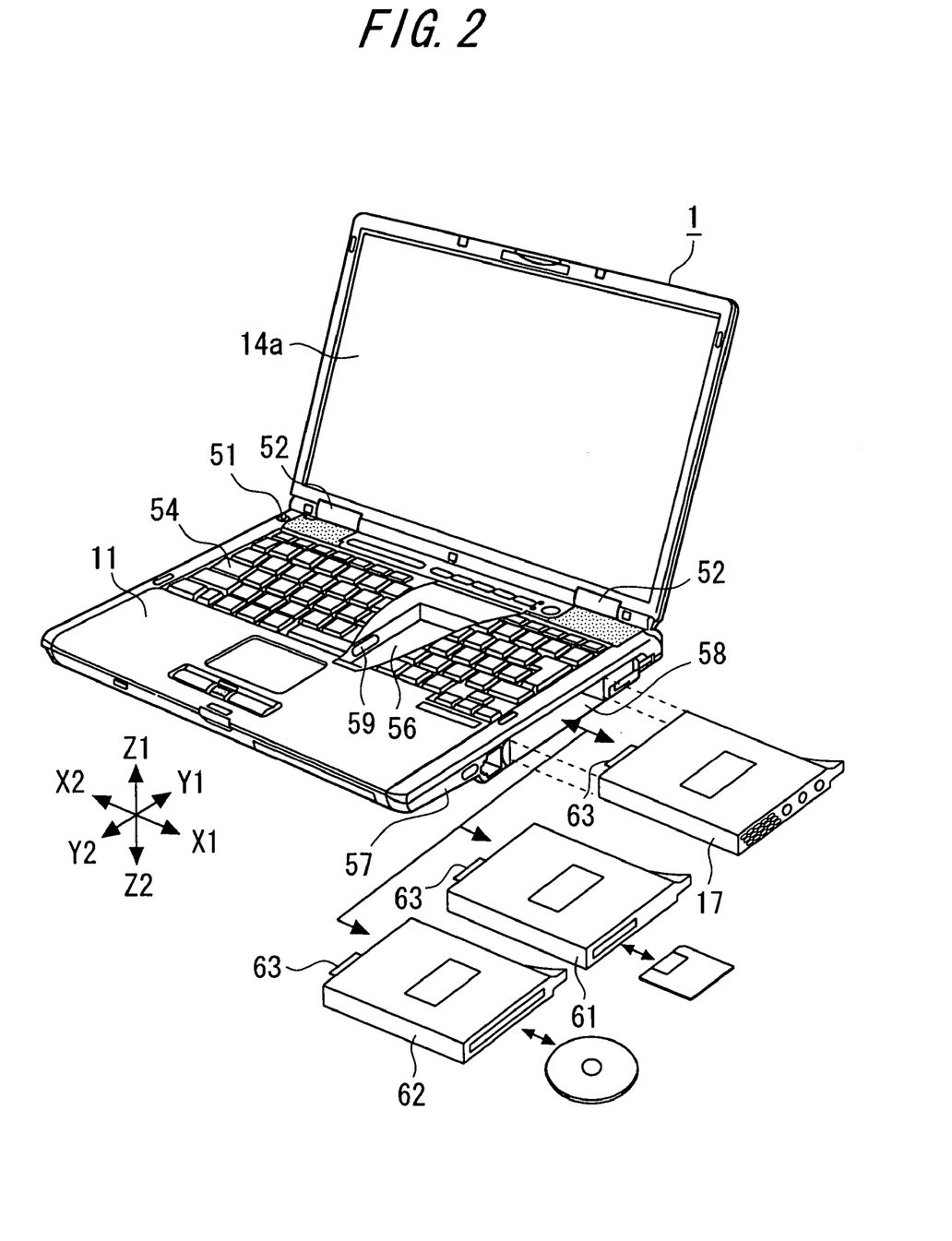
FIG. 2 is a view of an external configuration of the electronic device in the first embodiment.

FIG. 1 is a view of an outline of configuration of an electronic device in the embodiment. FIG. 2 is a view of an external configuration of the electronic device. As shown in FIG. 1, an electronic device 1 is an general type of computer (a note book type PC in this example) including a main body 11 accommodating a calculation processing unit 12 constructed of a CPU (Central Processing Unit), a main memory, etc., a storage unit (a hard disc) 13 stored with data and software for a calculation process, an input/output port 14, a communication control unit (CCU) 15, a CMOS memory 16, a tuner unit (receiving unit) 17, a timer 18, a power source unit 19, and so on.

Connected properly to the I/O port 14 are input devices such as a keyboard 54, a CD-ROM drive 62, an opening/closing sensor (state detection unit) 51 of a display unit, etc., and output devices such as a display (display unit) 14a, a speaker, etc.

The CCU 15 serves to perform communications with other computers via a network.

The CMOS memory 16 is stored with a program serving as BIOS (Basic Input Output System) and with setting information about an operation of the BIOS.

The storage unit 13 is installed with operating system (OS) and application software. Further, the storage unit 13 is recorded with data signals received by the tuner unit 17.

The calculation processing unit 12, when started up, executes a startup process such as authenticating a password by reading the BIOS from the CMOS memory 16, effecting POST (Power On Self Test), initializing the device, starting up (booting) the OS, and so on. With this operation, the calculation processing unit also functions as a control unit according to the invention. Further, the calculation processing unit 12 properly reads the OS and the application program from the storage unit 13 and executes the OS and the application program, and executes a calculation process of information inputted from the I/O port 14 and the CCU 15 and information read from the storage unit 13, thereby functioning also as a reservation setting module, a recording execution module and a reproducing module.

The reservation setting module accepts an input of reserving the recording from a user by displaying an input screen on the display device 14a and so forth, stores the storage unit 13 with the inputted reservation information, and stores the CMOS memory with startup time of a PC 1 for this recording.

The recording execution module compares the reservation time set by the reservation setting module with the present time of the timer 18 and, when reaching the reservation time, records the data signals of a TV broadcast received by the tuner unit 17 on the storage unit 13, thus conducting the recording.

The reproducing module, when reproduction of the recorded TV broadcast is indicated by a user's operation, reads the data signals from the storage unit 13, displays images on the display unit 14a and simultaneously outputs voices from the speaker, etc.

The power source unit 19 is constructed of a battery 19a, an AC power circuit 19b, a power source control circuit 19c, etc. The AC power circuit 19b is, when connecting an unillustrated plug to a plug socket of a commercial power source, supplied with the electric power and supplies the power to the respective units with a predetermined voltage value and a predetermined current value by making rectification, transformation and so on.

The power source control circuit 19c executes switchover of, when the AC power circuit 19b is connected to the commercial power source, i.e., when the electric power is outputted from the AC power circuit 19b, supplying the electric power to the respective units, and, when the electric power is not outputted from the AC power circuit, supplying the electric power to the respective units from the battery 19a. Further, the power source control circuit 19c detects a residual power quantity of the batter 19a. The power source control circuit 19c, if this residual power quantity is less than a predetermined value, performs charging by supplying the electric power to the battery 19a from the AC power circuit 19b, and, when this power quantity reaches a full charge, stops charging. Then, the power source control circuit 19c notifies the calculation processing unit 12 of state information such as information about which side, the AC power circuit 19b or the battery 19a, the electric power is supplied from, and information about the residual power quantity of the battery 19a, thus functioning also as the state detection unit.

Further, in FIG. 2, the notebook PC 1 is constructed of a computer body 11 and the display unit 14a connected in an openable/closable manner through a hinge 52 to the computer body 11. Note that when closing (folding) the display unit 14a, a front surface of the display unit presses down a contactor of the opening/closing sensor 51, thereby detecting a closed state. The opening/closing sensor 51 notifies the calculation processing unit 12 of a detection signal showing whether the display unit 14 is in the closed state or not.

Arrows X1, X2 represent a widthwise direction of the notebook PC 1, arrows Y1, Y2 represent a depthwise direction, and arrows Z1, Z2 represent a heightwise (thicknesswise) direction. The computer body 11 has a keyboard unit on its upper surface and a CPU, etc. in the interior thereof, and an extension bay accommodating extension units is formed on the right side in a lower part thereof. The extension bay 56 has an aperture 58 serving as an insertion port for the extension unit, which is formed in a right-side surface 57 of the computer body 11. The extension bay 56 takes a slit-like shape extending from this aperture 58 to the middle of the device in the direction of the arrow X2, and a connector 59 is provided at an edge portion on the X2-side thereof. Note that the connector 59 is located inwardly of the computer body 11, and hence, in FIG. 2, the body 51 is illustrated in a way that cuts off part of the upper surface of the body 51.

Moreover, the tuner unit 17, a FD unit 61, a CD-ROM unit 62, etc. are prepared as the extension units. Each of these extension units 17, 61, 62 takes a plate-like shape fittable (insertable) into the extension bay 56, and has a connector 63 fitted to the connector 59 at a front edge portion in an inserting direction (X2). Each of the units 17, 61, 62 is exclusively mounted into the extension bay 56. With this contrivance, the notebook PC 1 becomes accessible to the extension unit via the connector 59, thus enabling the function thereof to be extended.

Namely, the user selects any one of the tuner unit 17, the FD unit 61 and the CD-ROM unit 62 according to a want-to-utilize function and inserts the extension unit into the extension bay 56. Note that the extension bay 56 may be given a variety of terms in designation, and might be called a bay, an extension slot, a multi-bay and a multi-purpose bay.

Figure 3:
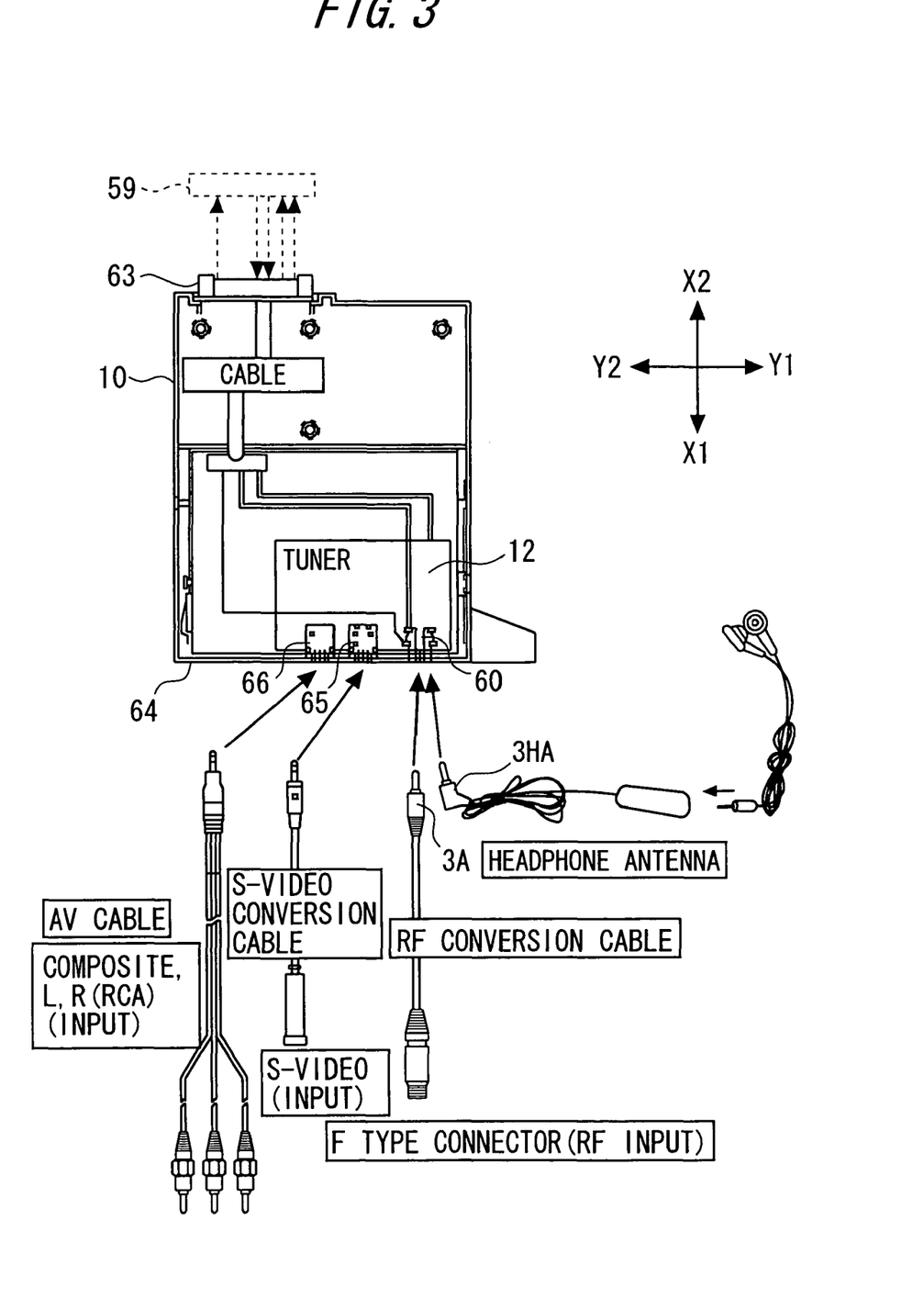
FIG. 3 is a view of an outline of configuration of a tuner unit.

FIG. 3 is a view of an outline of configuration of the tuner unit 17. As described above, a box body 10 takes substantially a plate-like shape in its external configuration, and the connector 63 is provided protruding from a front edge surface in its inserting direction (the direction X2). Further, a headphone antenna jack (connecting member) 60, an S-video input terminal 65 and a composite input terminal 66 are provided in alignment on an external packaging surface 64 that is positioned outwards and becomes flush with a right-side surface 57 of the notebook PC 2 when fitted to a rear edge surface in the inserting direction, i.e., inserted into the extension bay 56. A headphone antenna 3HA or an antenna 3A is connected to this headphone antenna jack 60, wherein the data signals of the TV broadcast are received via this antenna 3A/3HA.

Figure 4:
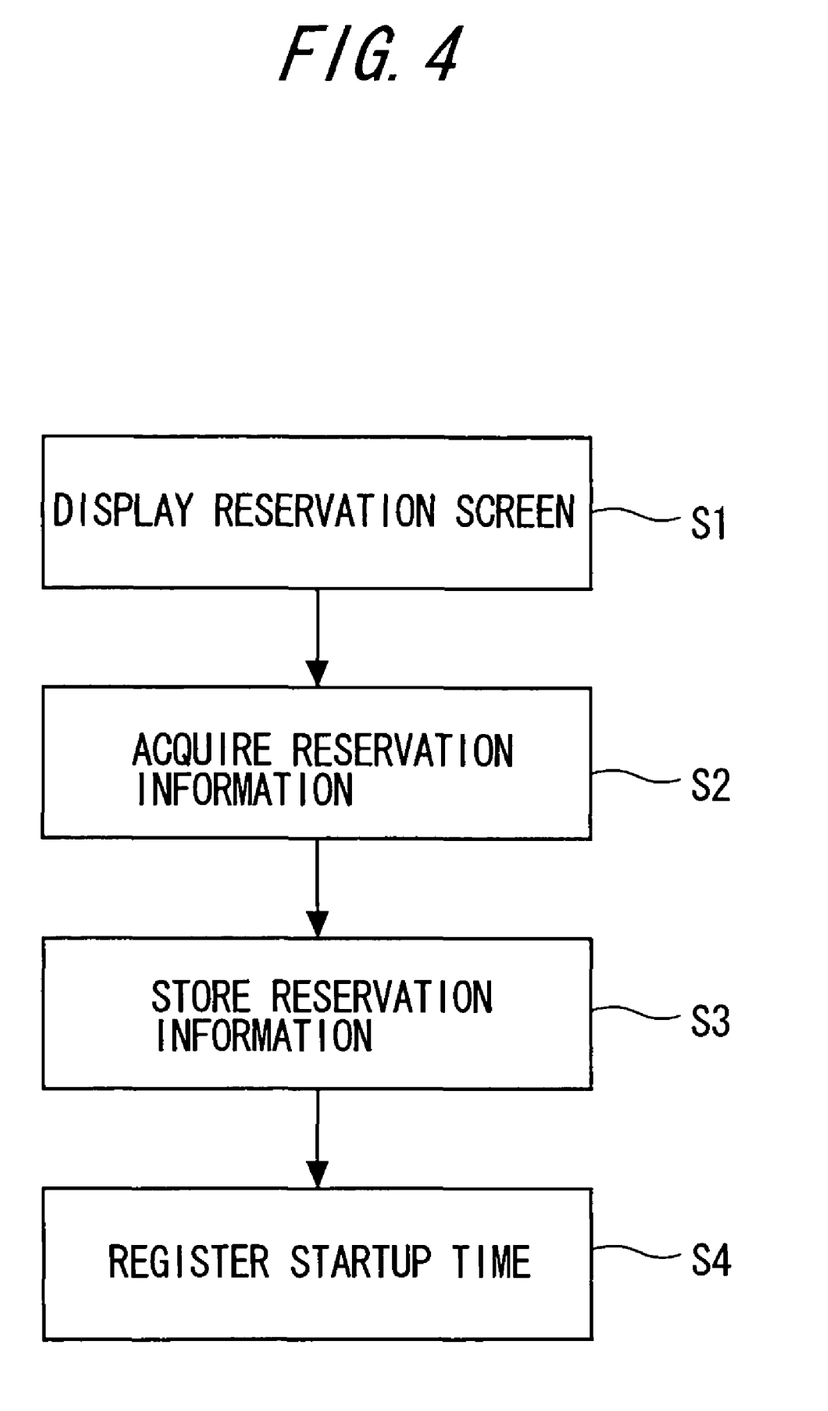
FIG. 4 is an explanatory diagram of a recording reservation setting method.

A recording reservation setting method and a recording reservation recording method executed on the thus-constructed notebook PC 1, will be explained with reference to FIGS. 4 and 5.

Figure 6:
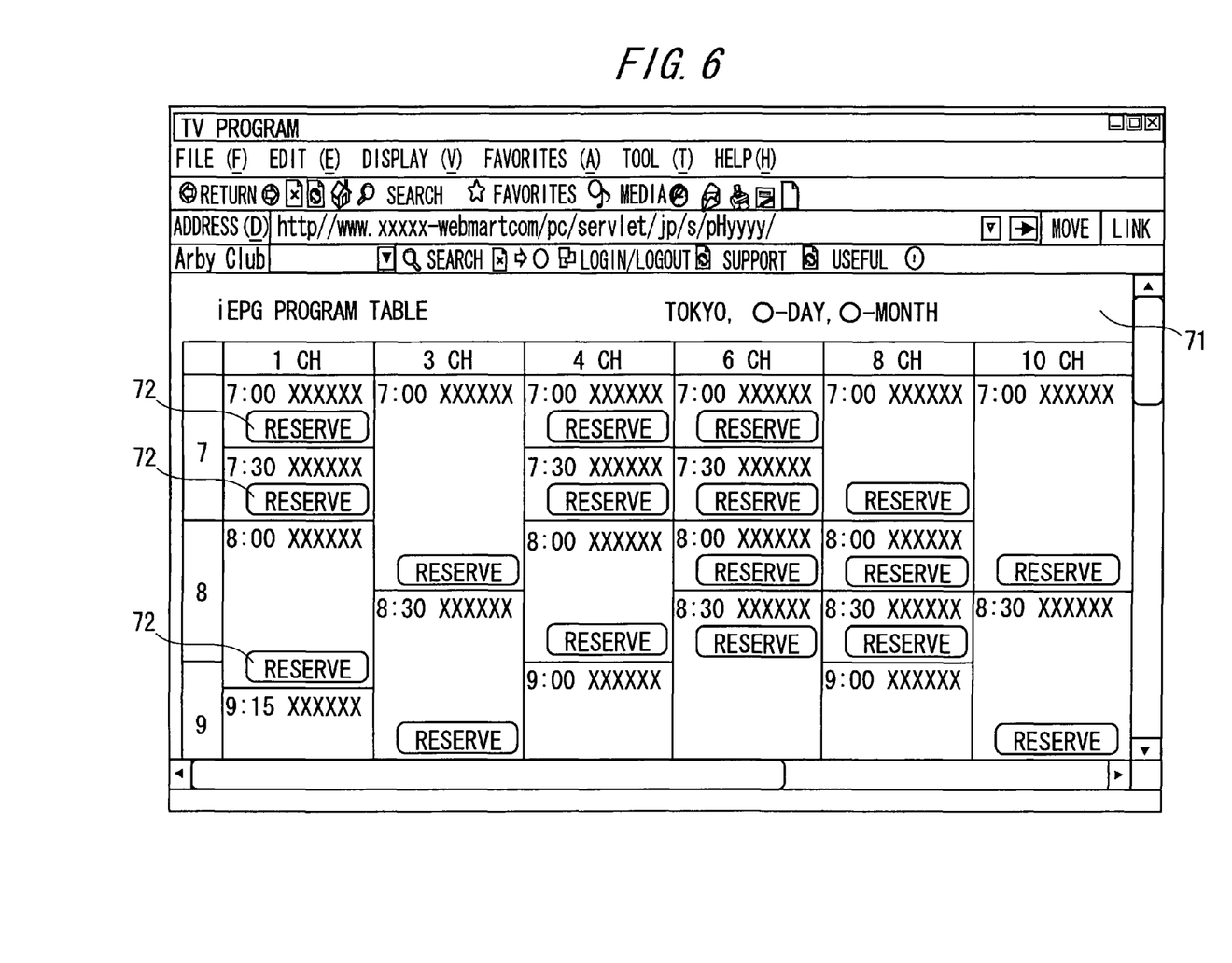
FIG. 6 is a diagram showing a display example a program table for reservation.

To begin with, in the startup state of the notebook PC 1, when the user starts up (boots) the software for recording and then selects the reservation setting, a program table for reservation as shown in FIG. 6 is obtained via a network such as the Internet, etc. and is displayed as a reservation screen 71 (step 1, which will hereinafter be abbreviated such as S1). When the user selects (clicks) a reservation button 72 for a want-to-reserve program from this program table, the notebook PC1 acquires pieces of reservation information such as program reservation time (start time, end time), possibility of extension, a title of the program, a channel number, etc. from the server (S2).

The notebook PC 1 displays the reservation information on the display unit 14a and simultaneously stores the reservation information on the storage unit 13 (S3). Note that the reservation information input method is not limited to this method and may involve displaying an input screen for the reservation information such as the reservation time, the channel number, etc. and arbitrarily inputting the reservation time and the channel number from the keyboard.

Then, the notebook PC 1, when instructed to move to a shutdown status, a standby status and an idle status, reads the reservation information from this storage unit 13 and registers, on the CMOS memory, time earlier by a predetermined period of time (i.e., the time expended for the startup) than the start time of a next reservation as startup time (S4), thus coming to the shutdown status, the standby status or the idle status.

Figure 5:
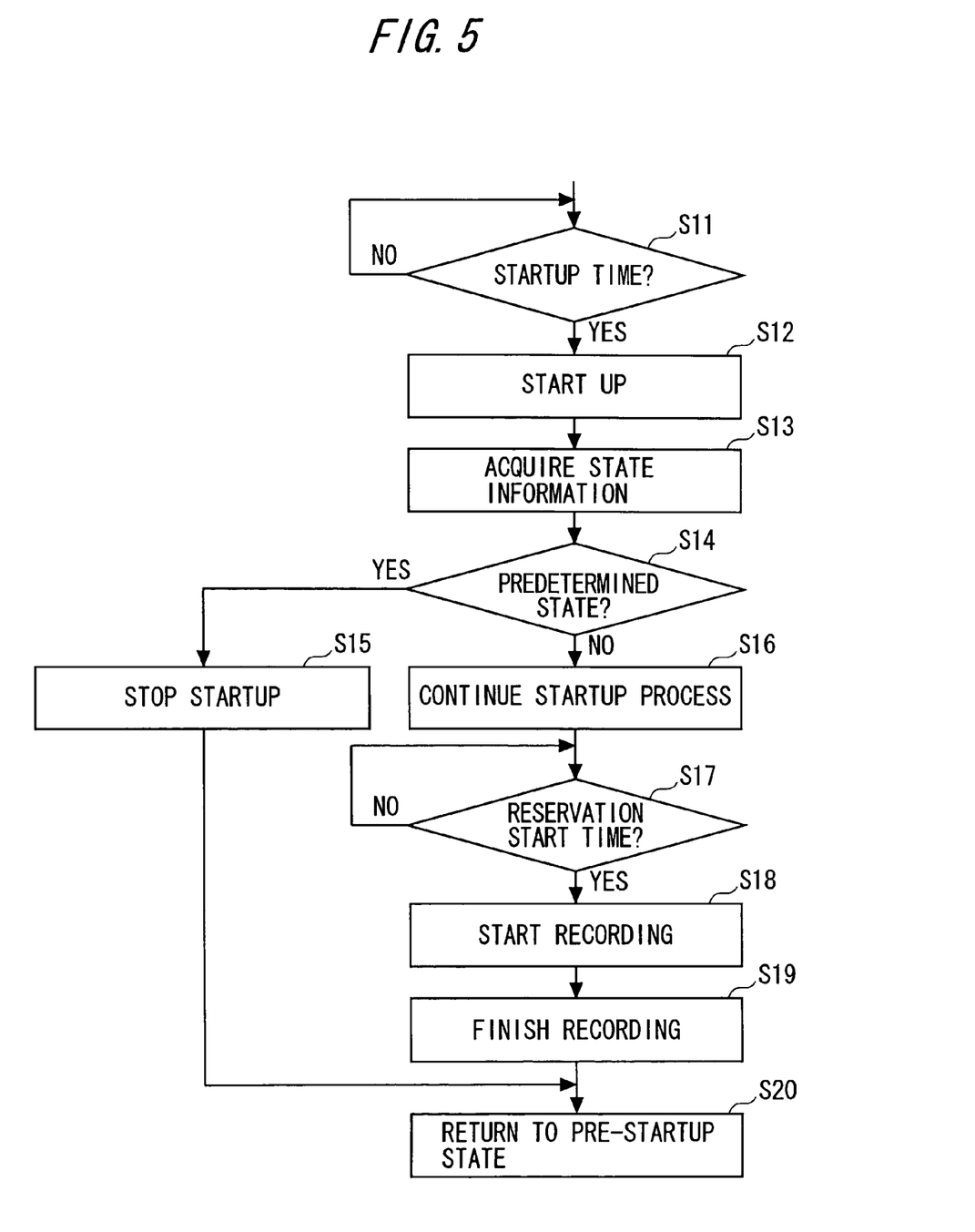
FIG. 5 is an explanatory diagram of the recording reservation recording method.

The built-in timer 18 of the notebook PC 1, in the shutdown-status, the standby status or the idle status, as shown in FIG. 5, compares the present time of the timer 18 with the startup time, and, when reaching the startup time, initiates the startup of the notebook PC 1 (S11-S12).

When the notebook PC 1 is started up, at first, the BIOS acquires the information about the opening/closing state of the display unit 14a through the opening/closing sensor 51 as the state information and the information showing whether driven by the battery through the power control unit 19c (S13).

Then, the notebook PC 1, when in the predetermined state, i.e., the display unit 14a is closed or when driven by the battery through the function of the control unit or when in both of these states, judges that the user keeps carrying, e.g., the notebook PC 1, and returns to the pre-startup status without executing the startup process such as reading the OS, and so on. Namely, the notebook PC 1 stops executing the recording process (S14-S15). Thereafter, the notebook PC 1 returns to the pre-startup status (the shutdown status, the standby status and the idle status) (S20).

Moreover, the notebook PC 1, when the display unit 14a is not closed or when driven by the AC power source, judges that the user does not carry, e.g., the notebook PC 1, and continues the startup process (S14, S16).

Then, after starting up the OS, through the function of the recording execution module, the notebook PC 1 starts recording at the recording start time (S17-S18), and, when the present time of the timer 18 reaches the end time stored on the storage unit 13, finishes the recording (S19). Then, the notebook PC 1 returns to the pre-startup status (the shutdown status, the standby status and the idle status) (S20).

Thus, according to the embodiment, the on-carrying state is judged from whether driven by the battery 19a or the display unit 14a is in the closed state, and if in the on-carrying state of the PC 1, the recording can be stopped. With this contrivance, it is possible to prevent the battery power from becoming deficient at a go-out destination after carelessly starting the recording, the recording from being started in a state of removing the antenna and also the device from being heated up.

Moreover, in the embodiment, the recording process is stopped in the closed state of the display unit 14a but is executed only in the opened state of the display unit 14a when the heat generated from the CPU and the hard disc is radiated from the surface of the body unit, thereby making it possible to avoid occurrence of thermal runaway and to actualize the normal recording process.

Other Embodiment

The invention is not limited to only the illustrated examples given above and can be, as a matter of course, changed in a variety of forms within the scope that does not deviate from the gist of the invention.

In the embodiment, the on-carrying state is judged by detecting the opening/closing state of the display unit 14a and detecting whether driven by the battery or not as the state information, however, the judgment is not limited to this method and may be made based on other information such as a temperature of the CPU by use of a temperature sensor, positional information based on GPS (Global Positioning System), a vibrated or non-vibrated state by using a vibration sensor, an amount of ambient light by use of an optical sensor, a connected or non-connected state of the antenna, and so forth.

Namely, for example, if the temperature of the CPU is higher than a predetermined value in the closed state of the display unit, it may be judged that the device is carried while being put into a bag, etc.. Moreover, if the positional information based on the GPS is beyond a predetermined positional range of a home, a company, etc., it may be judged that the user goes out (the on-carrying state). If the vibrations (detected) by the vibration sensor are coincident with predetermined patterns of walking, (traveling by) train and soon, or if the vibrations are greater than normal-operating vibrations of the notebook PC 1, it may be judged that the PC 1 is in the on-carrying state. The on-carrying state may also be judged from a non-connected state when detecting whether or not the antennas 3HA, 3A are connected to the headphone antenna jack 60. When the amount of received light of the optical sensor is less than a predetermined amount of light and when the present time of the timer 18 is in a daytime zone, it may also be judged that the device is carried while being put into the bag.

Moreover, the reservation setting module may register, together with the startup time, a piece of information indicating a purport that this startup time is the recording reservation time on the CMOS memory. Then, the BIOS, when started up upon reaching this startup time, refers to the information showing whether this startup time represents the recording reservation or not, and, if representing the recording reservation, executes a process (S13-S18) about whether the recording is stopped as described above. Whereas if the startup time does not represent the recording reservation, the BIOS may switch over the processing sequence so as to execute the startup process without doing the process (S13-S18). This makes it possible to prevent the startup from being stopped by the process described above if the startup time is set by other scheduling software.

Figure 7:
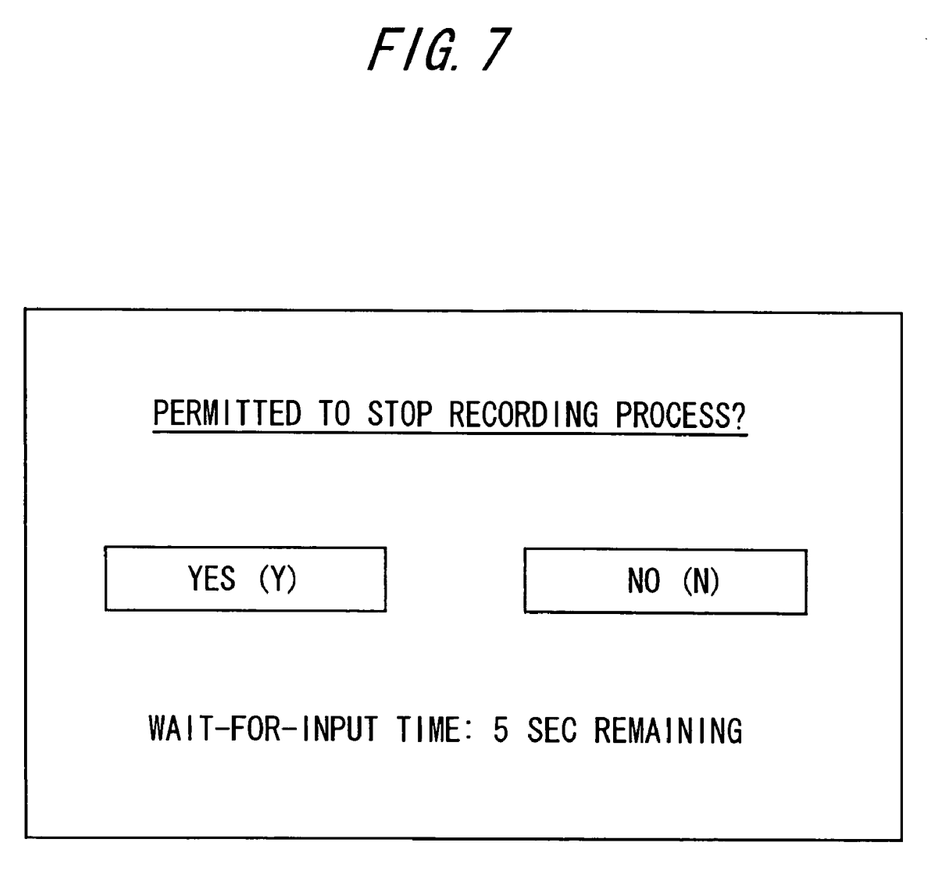
FIG. 7 is a diagram showing a screen for query about possibility of stopping a recording process.

Further, the state information is acquired, and, when the display unit 14a is closed or when driven by the battery as in the predetermined state (S14), as shown in FIG. 7, a query message about whether the recording process can be stopped or not, may also be displayed on the screen. If the user selects permission of the stoppage in response to this message (in the case of selecting [Yes] on the screen), or if none of indicative inputs are inputted within a predetermined period of time, the recording process is stopped (S15). If the user selects rejection of stopping the recording (in the case of selecting [No] on the screen), the startup process may continue (S16). Thus, the user is queried about whether the recording can be stopped or not in the state of stopping the timer reservation recording, thereby enabling the user to judge that the recording reserved by the timer can be completed within the residual quantity of power of the battery even in, e.g., the driven-by-the-battery state. Moreover, if the state of stopping the timer reservation recording is the unconnected state of the antenna, the user can make a preparation for the recording process by connecting the antenna, whereby the recording can be done.

Still further, instead of prompting the user to select the stoppage/continuation of the timer reservation recording by displaying the message on the screen as described above, the timer reservation recording may be stopped by displaying a purport of stopping on the screen. This configuration (scheme) enables the user to recognize that the reservation recording is to be stopped and to execute the recording process by making again the timer reservation or by the manual operation after being stopped.

INDUSTRIAL APPLICABILITY

The invention can be widely applied to a PDA (Personal Digital Assistant), a cellular phone, etc. in addition to the personal computer given above.

INCORPORATION BY REFERENCE

The disclosures of Japanese patent application No. JP2004-380597 filed on Dec. 28, 2004 including the specification, drawings and abstract are incorporated herein by reference.

What is claimed is:
1. An electronic device comprising:
a receiving unit to receive data signals that have been broadcast;
a control unit to start, in response to a preset reservation time, a launch process for preparing to start, in response to a preset recording time, a process of recording the data signals on a storage unit; and
a state detection unit to detect a state relating to the electronic device during the launch process, wherein said control unit determines to continue or stop the launch process started in response to the preset reservation time, in accordance with a result of the detection by said state detection unit,
wherein said electronic device is configured to be driven by both of a battery and an external power source,
said state detection unit detects whether the battery is used or not, and
said control unit determines to stop the launch process when the battery is used.

2. An electronic device according to claim 1, wherein said state detection unit detects whether or not said electronic device is moving, and
said control unit determines to stop the launch process when said electronic device is moving.

3. An electronic device according to claim 1, further comprising:
a display unit having a use mode and a non-use mode;
said state detection unit detects whether the display unit is in the use mode or the non-use mode; and
said control unit determines to stop the launch process when the display unit is in the non-use mode.

4. An electronic device according to claim 1, further comprising:
a display unit; and
a body unit to which said display unit is connected in a openable/closable manner through a hinge; and
wherein said state detection unit detects whether the body unit and the display unit are disposed in an open or closed state, and
said control unit determines to stop the launch process when the body unit and the display unit are disposed in the closed state.

5. An electronic device according to claim 1, wherein said electronic device is a computer utilizing BIOS and OS, and
said BIOS instructs said state detection unit to execute the detection, and switches OFF a power source of the computer without starting up said OS in the case of stopping the launch process in accordance with a result of the detection.

6. An electronic device according to claim 1, wherein in a state of stopping the launch process, said control unit displays, on said display unit, a message making a query about whether the recording can be stopped or not, and determines to stop the launch process based on an input.

7. A recording control method for an electronic device, the method comprising:
receiving data signals that have been broadcast;
starting, in response to a preset reservation time, a launch process for preparing to start, in response to a preset recording time, a process of recording the data signals on a storage unit;
detecting a state related to the electronic device during the launch process; and
determining to continue or stop the launch process started in response to the preset reservation time, in accordance with a result of the detection,
wherein said electronic device is configured to be driven by both of a battery and an external power source,
the detecting detects whether the battery is used or not, and
the determining determines to stop the launch process when the battery is used.

8. A recording control method according to claim 7, wherein the detecting detects whether or not said electronic device is moving, and
the determining determines to stop the launch process when the electronic device is moving.

9. A recording control method according to claim 7, wherein said electronic device includes a display unit having a use mode and a non-use mode;
the detecting detects whether the display unit is in the use mode or the non-use mode; and
the determining determines to stop the launch process when the display unit is in the non-use mode.

10. A recording control method according to claim 7, wherein said electronic device includes a display unit and a body unit to which said display unit is connected in a openable/closable manner through a hinge,
the detecting detects whether the body unit and the display unit are disposed in an open or closed state and
the determining determines to stop the launch process when the body unit and the display unit are in the closed state.

11. A recording control method according to claim 7, wherein BIOS of said electronic device performs the detection of the state, and
a power source of the electronic device is switched OFF without starting up OS based on the result of the detection.

12. A recording control method according to claim 7, further comprising:
displaying a message making a query about whether the recording can be stopped or not; and
the determining determines to stop the launch process based on an input.

13. A non-transitory recording medium recorded with a program, which when executed by a processor of an electronic device, causes the processor to perform a method, the method comprising:
receiving data signals that have been broadcast;
starting, in response to a preset reservation time, a launch process for preparing to start, in response to a preset recording time, a process of recording the data signals on a storage unit; and
detecting a state related to the electronic device during the launch process; and
determining to continue or stop the launch process started in response to the preset reservation time, in accordance with a result of the detection,
wherein said electronic device is configured to be driven by both of a battery and an external power source,
the detecting detects whether the battery is used or not, and
the determining determines to stop the launch process when the battery is used.

14. A non-transitory recording medium according to claim 13, wherein
the detecting detects whether or not said electronic device is moving, and
the determining determines to stop the launch process when the electronic device is moving.

15. A non-transitory recording medium according to claim 13, wherein said electronic device includes a display unit having a use mode and a non-use mode;
the detecting detects whether the display unit is in the use mode or the non-use mode; and
the determining determines to stop the launch process when the display unit is in the non-use mode.

16. A non-transitory recording medium according to claim 13, wherein said electronic device includes a display unit and a body unit to which said display unit is connected in a openable/closable manner through a hinge, the detecting detects whether the body unit and the display unit are disposed in an open or closed state, and the determining determines to stop the launch process when the body unit and the display unit are in the closed state.

17. A non-transitory recording medium according to claim 13, wherein BIOS of said electronic device performs the detection of the state, and a power source of the electronic device is switched OFF without starting up OS based on the result of the detection.

18. An electronic device comprising:

a receiving unit to receive data signals that have been broadcast;

a control unit to start, in response to a preset reservation time, a launch process for preparing to start, in response to a preset recording time, a process of recording the data signals on a storage unit; and a state detection unit to detect a state relating to the electronic device during the launch process, wherein said control unit determines to continue or stop the launch process started in response to the preset reservation time, in accordance with a result of the detection by said state detection unit, wherein said state detection unit detects at least one of a temperature, positional information, a vibrated information, an amount of ambient light and a state of an antenna as the state relating to the electronic device to the recording of the data signals.

19. A recording control method for an electronic device, the method comprising:

receiving data signals that have been broadcast;

starting, in response to a preset reservation time, a launch process for preparing to start, in response to a preset recording time, a process of recording the data signals on a storage unit;

detecting a state related to the electronic device during the launch process; and determining to continue or stop the launch process started in response to the preset reservation time, in accordance with a result of the detection, wherein the detecting detects at least one of a temperature, positional information, a vibrated information, an amount of ambient light and a state of an antenna as the state relating to the electronic device to the recording of the data signals.

20. A non-transitory recording medium recorded with a program, which when executed by a processor of an electronic device, causes the processor to perform a method, the method comprising:

receiving data signals that have been broadcast;

starting, in response to a preset reservation time, a launch process for preparing to start, in response to a preset recording time, a process of recording the data signals on a storage unit; and detecting a state related to the electronic device during the launch process; and determining to continue or stop the launch process started in response to the preset reservation time, in accordance with a result of the detection, wherein the detecting detects at least one of a temperature, positional information, a vibrated information, an amount of ambient light and a state of an antenna as the state relating to the electronic device to the recording of the data signals.

* * * * *